W. V. GAGE.
ANIMAL TRAP.
APPLICATION FILED JULY 14, 1913.
1,121,583.
Patented Dec. 15, 1914.
2 SHEETS—SHEET 1.
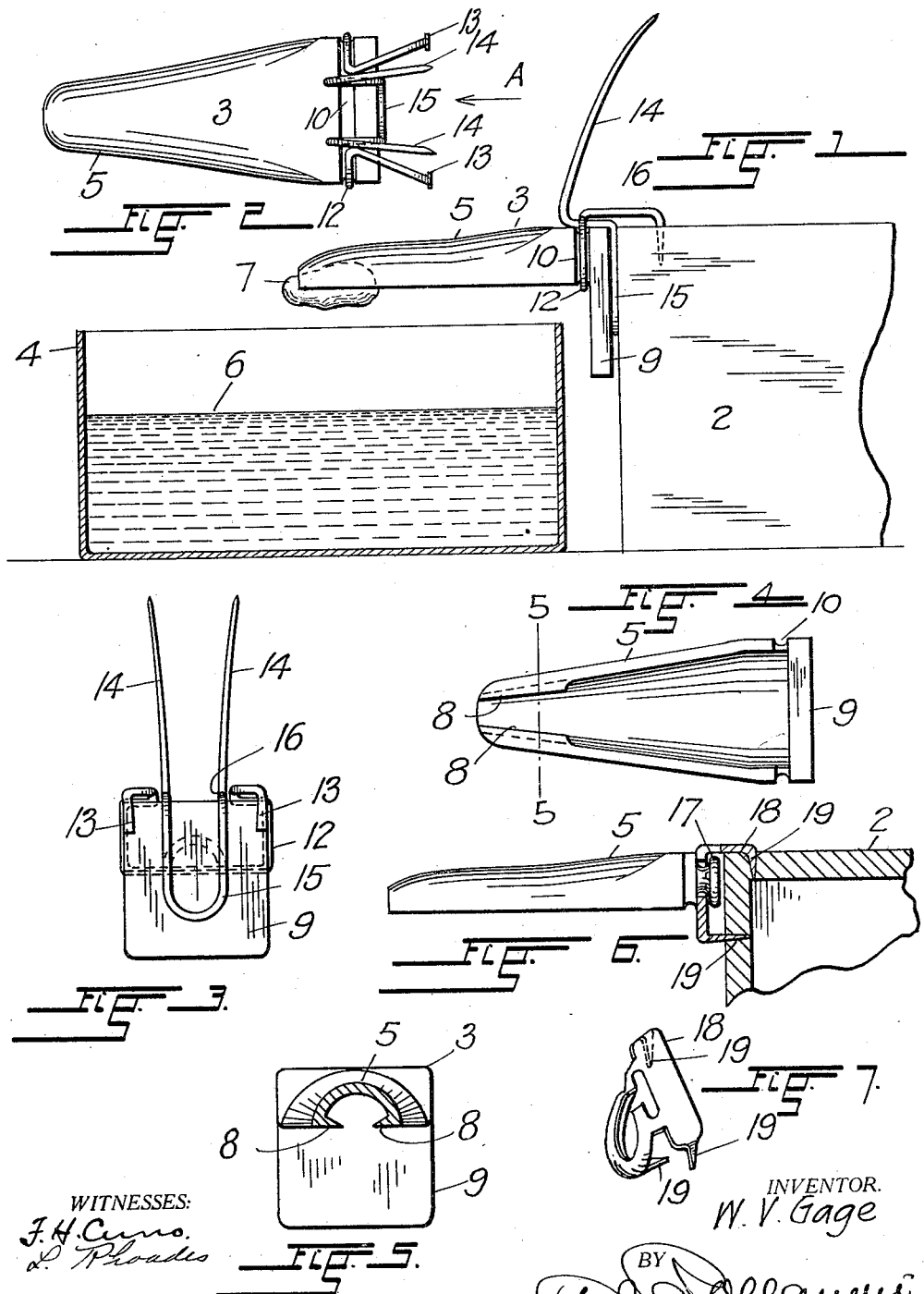
WITNESSES:
INVENTOR.
W. V. Gage
BY
ATTORNEY W. V. GAGE.
ANIMAL TRAP.
APPLICATION FILED JULY 14, 1913.
1,121,583.
Patented Dec. 15, 1914.
2 SHEETS—SHEET 2.
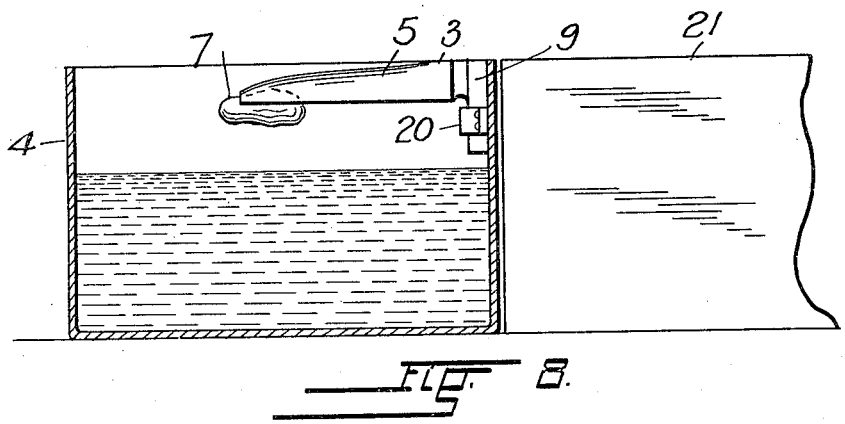
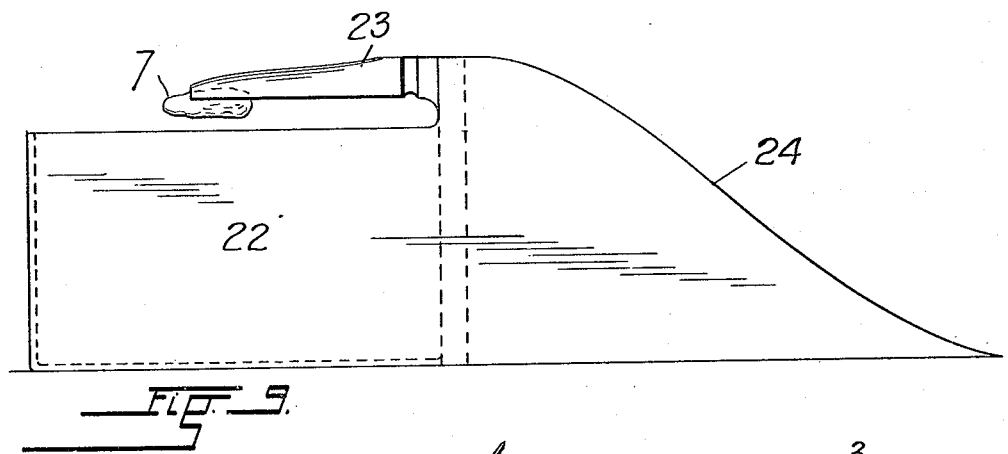
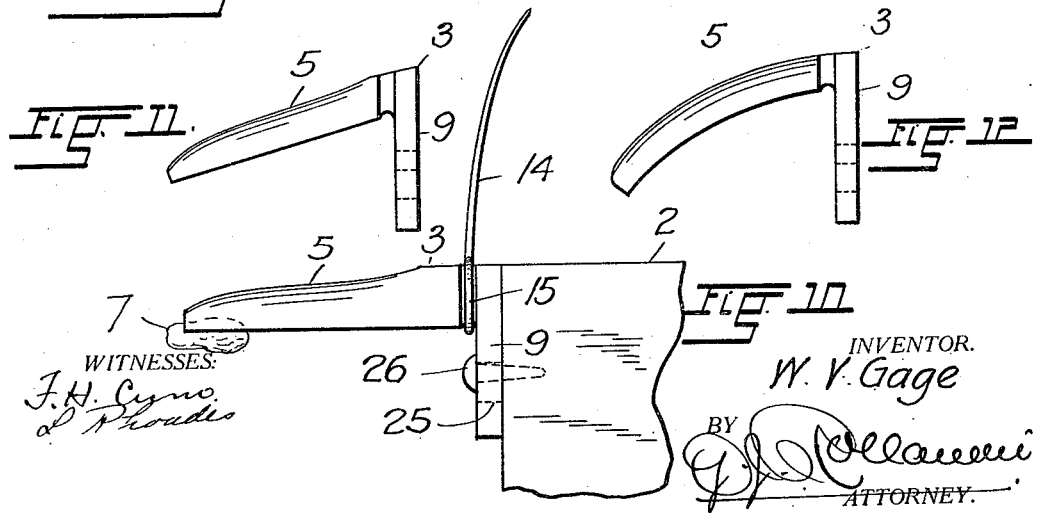
INVENTOR.
W. V. Gage

UNITED STATES PATENT OFFICE.

WILL V. GAGE, OF PRIMERO, COLORADO, ASSIGNOR OF ONE-FOURTH TO GUY A. PAYNE, OF PRIMERO, COLORADO, AND ONE-FOURTH TO BENJAMIN F. SPRINGER, OF TRINIDAD, COLORADO.

ANIMAL-TRAP.

1,121,583.  Specification of Letters Patent.  Patented Dec. 15, 1914.

Application filed July 14, 1913. Serial No. 778,984.

*To all whom it may concern:*

Be it known that I, WILL V. GAGE, a citizen of the United States, residing at Primero, in the county of Las Animas and State of Colorado, have invented certain new and useful Improvements in Animal-Traps, of which the following is a specification.

This invention relates to animal traps and more particularly to devices of this character which are specially adapted for entrapping mice and rats.

My invention consists briefly, in the provision of an oblong bracket which projects laterally from a suitable upright support, above a receptacle adapted to receive and retain the entrapped animals. The upper surface of this bracket is smooth and transversely rounded and it has at its outer end, means for securing a piece of cheese or other bait by which the rodents are attracted and which causes them to venture onto the smooth surface.

Experiments have fully demonstrated the fact that when the animal has once moved onto the bracket, all attempts to return to the support from which the latter projects are of no avail, and the animals invariably lose their foot-hold on the slippery surface and fall off the bracket into the subjacent receptacle which is preferably, partially filled with water in which the animals eventually drown.

The devices whereby the bracket may be attached to the support from which it projects, the means employed to secure bait at its extremity, or the material of which it is constructed are all features which though necessary in the operation of my invention, are of minor importance, the one essential requirement for the effectuality of the invention being the smooth surface which prevents a rodent which has moved thereon, from in any way returning to the support with which the device is connected.

Inasmuch as the animals usually lose their footing on the surface of the bracket before they reach the bait placed at the extremity thereof, my trap is particularly adapted to catch mice and rats in large quantities.

My improved trap is adapted to catch rats as well as mice, all that is necessary to adapt it for the entrapment of the larger animals, being to make its proportions sufficiently large to compel them to move entirely onto its slippery surface before they can reach the bait.

In case a trap designed exclusively for catching mice is used in a place also infested with rats, I secure at the end of the bracket adjacent the support from which it projects, a simple attachment which without interfering with the progress of the smaller animals, prevents the larger rodents from moving onto the bracket.

In the accompanying drawings in the various views of which like parts are similarly designated, Figure 1 represents a side elevation of my improved trap in its preferred form, the receptacle in which the animals are collected having been shown in section, Fig. 2, a plan view of the bracket detached from its support, Fig. 3, a rear end elevation of the detached bracket looking in the direction of the arrow A, Fig. 2, Fig. 4, an underneath view of the bracket without the means by which it is fastened to the support, Fig. 5, a section taken along the line 5—5, Fig. 4, Fig. 6, a sectional elevation showing a modified construction of the bracket and the means employed to fasten it to the support, Fig. 7, a perspective view of the fastening device used in the construction shown in Fig. 6, Fig. 8, a sectional elevation showing a method of securing the bracket directly to the side of the container in which the entrapped animals are received, Fig. 9, an elevation of a trap of modified construction, Fig. 10, a fragmentary elevation showing another modification of the invention, and Figs. 11 and 12, elevations of the detached bracket illustrating two different constructions of the projecting part thereof.

Referring first to Figs. 1 to 5 of the drawings, the reference numeral 2 designates a support which may be of any suitable construction, an ordinary packing box, for example, being well adapted for the purpose.

3 designates the bracket which projects from the side of the support in a plane with the upper surface of the same, and 4 indicates the receptacle which is disposed below the laterally projecting part 5 of the bracket to receive the animals which fall off the same, the receptacle being partially filled with a liquid as shown at 6.

The upper surface of the laterally projecting member 5 of the bracket is smoothly finished and transversely rounded. The member tapers slightly toward its outer extremity and its under surface is hollowed, principally for the purpose of placing a piece of bait, such as shown at 7 in Fig. 1, between two oppositely projecting, sharp-edged lips 8 formed at its outer end.

A plate 9 formed integral with the projecting member of the bracket at substantially right angles thereto, is provided to engage the upright surface of the support from which the bracket projects, and the member 5 is provided adjacent the said plate with a groove 10 for the reception of a contrivance of spring wire by means of which the device is removably attached to the support.

The fastening contrivance consists of a yoke 12 which is adapted to occupy the groove 10 in embracing relation to the member 5 and the end portions of which are at the upper side of the bracket, bent rearwardly and downwardly to provide sharp-edged prongs 13 which when driven into the top of the support as shown in the drawings, securely fasten the bracket in its operative position with relation thereto.

In the construction shown in Figs. 1, 2 and 3 the attachment provided to prevent animals larger than mice from reaching the bait at the end of the projecting part of the bracket, has been shown in its operative position. This attachment consists of a pair of sharp pointed horns 14 which are connected at their lower ends by a U-shaped shank 15 which is offset at 16 to provide a seat which in practice rests upon the upper surface of the bracket, as shown in Fig. 1. The horns 14 diverge upwardly and are curved rearwardly with respect to the bracket to which the attachment is applied by placing the yoke between the plate 9 of the bracket and the side of the support from which it projects. The distance between the horns at their lower ends, is made sufficiently large to allow the movement of a mouse between them, but too small for the passage of a rat, and the larger animals are thus prevented thereby from reaching the surface of the projecting part of the bracket.

In the construction shown in Figs. 6 and 7, the projecting piece 5 is formed separately and provided at its rear end with an integral button 17 adapted to be inserted into a corresponding recess of a metallic device 18 which by means of downwardly and inwardly projecting prongs 19, is secured to the support.

The bracket shown in Fig. 8 is constructed similar to that illustrated in Fig. 1, but it is secured directly to the receptacle at the inner surface of one of the upright sides thereof by inserting the plate member 9 through a loop 20 secured to the said side below its upper edge. The receptacle in this construction, is placed contiguous to a box 21 or other suitable article, the upper surface of which extends approximately in a plane with the upper edge of the receptacle and with the upper surface of the projecting part of the bracket.

In the construction shown in Fig. 9, a receptacle 22 and a projecting piece 23 which is constructed similar to the part 5 of the hereinbefore described brackets, are cast integral with each other and at one side of the receptacle is formed an inclined approach 24 which renders the projection readily accessible and thereby increases the effectuality of the device.

The construction illustrated in Fig. 10 differs from the others only in that the bracket has no fastening means other than a slot 25 in its plate member to receive a nail or screw 26 which is driven in the side of the support 2 for the suspension of the bracket.

The brackets shown in Figs. 11 and 12 differ from those hereinbefore described in that their laterally projecting parts 5 are formed at an acute angle to their plate members 9, that shown in Fig. 12 being curved longitudinally, while that illustrated in Fig. 11 is substantially straight.

While the brackets comprised in the invention may be composed of any material adapted to be smoothly finished, I prefer to make the article of glass which has a natural polish and is easily cleaned.

The operation of the trap is as hereinbefore explained exceedingly simple, the animal smelling the bait crawls from the support 2 onto the smooth rounded surface of the lateral projection 5, loses his footing and falls into the receptacle in which it drowns.

The trap once being provided with bait is adapted to catch a number of rodents, limited only by the capacity of the receptacle, for experiments have proven that in almost every instance the animals fall off the projection before they have been able to reach the bait.

Having thus described my invention what I claim and desire to secure by Letters-Patent is:

1. An animal trap comprising in combination with a suitable support, a lateral projection having a smooth upper surface, and at its outer end, means for securing bait, a receptacle disposed to receive animals falling off the said projection, and a pair of upwardly projecting horns at the end of the projection adjacent the support, in spaced relation to each other, to provide a passage of limited width.

2. In a mouse trap, a bracket including a projecting member having a smooth upper surface and at the underside of its outer end, a pair of oppositely disposed lips to secure bait.

3. In an animal trap, a bracket including two angularly disposed members, one of which has a smooth upper surface and means at its outer end for securing bait, and the other member having means for securing the bracket to an upright support.

4. In an animal trap, an oblong piece having a smooth upper surface and at one of its ends, means for securing bait, and means for securing said piece in a projecting position on a support to which its opposite end is adjacent.

5. An animal trap comprising a receptacle, a projection supported at one of its ends, above the said receptacle and having a smooth upper surface and at its opposite end, means for securing bait, and a pair of connected horns adapted to be secured at the first mentioned end of said projection, in an upwardly projecting position, said horns being spaced to provide a passage of limited width.

6. An animal-trap comprising a projecting member fixed at one of its ends and having a smooth upper surface which provides an only path for animals from its said end to a bait placed adjacent its opposite end, a receptacle disposed to receive animals falling off the said member, and means at the fixed end of the member for preventing access to the said surface of the same, to animals of more than a determinate size.

7. In an animal trap, an oblong member capable of being fixed at one of its ends in projecting relation to a support and having at its opposite end, means for securing bait, the upper surface of said member being smooth and laterally slanting to cause rodents to lose their foothold thereon when attempting to approach bait secured by said means.

8. The combination with a support, of an oblong member projecting laterally therefrom at an elevation above its base, and means for securing bait adjacent the outer end of the member, the upper surface of the member being smooth and laterally slanting to cause rodents to lose their foot-hold thereon when attempting to approach bait secured by said means.

9. The combination with an open-receptacle of an oblong member fixed at one of its ends and projecting over the receptacle, and means for securing bait adjacent the opposite end of the member, the upper surface of the member being smooth and laterally slanting to cause rodents to lose their foot-hold thereon when attempting to approach bait secured by said means.

10. An animal-trap comprising a projecting member fixed at one of its ends and having a smooth upper surface which provides an only path for animals from its said end to a bait placed adjacent its opposite end, a receptacle disposed to receive animals falling off the same member, and means detachably disposed at the fixed end of the member for preventing access to the said surface of the same, to animals of more than a determinate size.

In testimony whereof I have affixed my signature in presence of two witnesses.

WILL V. GAGE.

Witnesses:
K. M. BRANSON,
L. G. DEY.

Copies of this patent may be obtained for five cents each, by addressing the "Commissioner of Patents, Washington, D. C."